April 17, 1951     I. L. ASHKENAS     2,549,045
MEANS OF CONTROLLING WING TIP STALL IN AIRPLANES
Filed Jan. 26, 1948     4 Sheets-Sheet 1

INVENTOR.
IRVING L. ASHKENAS
BY Herbert E. Metcalf
Attorney

INVENTOR.
IRVING L. ASHKENAS
BY Herbert E. Metcalf
Attorney

INVENTOR.
IRVING L. ASHKENAS
BY Herbert E. Metcalf
Attorney

Patented Apr. 17, 1951

2,549,045

UNITED STATES PATENT OFFICE 2,549,045

MEANS OF CONTROLLING WING TIP STALL IN AIRPLANES

Irving L. Ashkenas, Beverly Hills, Calif., assignor to Northrop Aircraft, Inc., Hawthorne, Calif., a corporation of California Application January 26, 1948, Serial No. 4,414

7 Claims. (Cl. 244—42)

The present invention relates to anti-stall slots for airplanes, and, more particularly, to a means and method of controlling tip stall in airplanes having swept-back wing panels. The invention is ideally adapted for use in conjunction with all-wing airplanes, such as those, for example, developed and built for the U. S. Army by Northrop Aircraft, Inc., the assignee of the present invention.

In any airplane, the primary parameter determining the static longitudinal stability is the position of the center of gravity with respect to the center of lift, or the neutral point. In a basic wing type aircraft, the neutral point may be shifted aft by adding a tail or, preferably, by sweeping the wing. The center of gravity can be shifted forward by proper weight distribution, so from the standpoint of static longitudinal stability, no particular configuration has any especial advantage, except as it affects the possibility of proper balance.

In an all-wing airplane, the elimination of the tail makes the problem of balance somewhat critical, even though the wing panels are swept-back, although not excessively so. Unfortunately, however, for any given airplane, the neutral point does not ordinarily remain fixed with variations of power, flap setting, or even lift coefficient, so that the aft center of gravity limit for stability is often prescribed by some single flight condition. Extensive experience by the present inventor and his associates with tailless aircraft has shown that the critical condition for longitudinal stability has always occurred for power-off flight at angles of attack approaching a stall, i. e., during landing maneuvers.

The experience mentioned above has made the pitching instability of a swept wing a familiar phenomenon. The complete mechanisms involved, however, are still somewhat obscure. There are apparently two opposing effects which are of prime importance. They are, the tendency for sweep-back to increase the relative tip loading and also (by creating a span-wise pressure gradient) to promote boundary layer flow toward the wing panel tips.

On a clean swept-back wing the latter effect apparently nullifies the former so that there occurs in the tip portion of the wing panel a gradual decrease in effective section lift-curve slope with a resulting progressive decrease in stability. Under these conditions, however, the tip never completely stalls, as will be more fully pointed out later.

On a swept-back wing panel, however, which has had any basic modifications made thereon that affects the span-wise flow, there will be a noticeable effect on the pitching behavior at high lift coefficients, as the normally expected tip stall will be produced, as evidenced by strongly unstable moments in the vicinity of the maximum lift coefficient.

One of the basic modifications, for example, of an all-wing craft, in the above respect, particularly when pusher propellers are used, is the propeller shaft housings. These housings act to inhibit span-wise flow somewhat and to tend to straighten out the moment curve below the stall, but to increase the unstable tendencies at the stall. Consequently, in order to obtain stability at the stall, other means must be resorted to, and it is an object of the present invention to provide a means and method of increasing the stalling angle of the wing tip sections.

I have found that a tip slot can be utilized to increase the stalling angle of the tip sections.

However, experience has also shown that it is not always possible for a pilot to detect the approach to a stall. In consequence, it is another object of the present invention to provide a means and method of automatically opening the normally closed tip slots as a stall is approached, preferably at predetermined values of lift coefficient of the wing tips.

The possibility of controlling the stalled portions of the wing, as outlined above, means that trailing edge flap controls can be laid out to maintain their effectiveness at high angles of attack, and this effect can be efficiently utilized, such a flap layout, however, forming no part of the present invention.

My invention can be more fully understood by reference to the drawings, showing a preferred form of the invention as applied to an all-wing army bomber.

Figure 1:
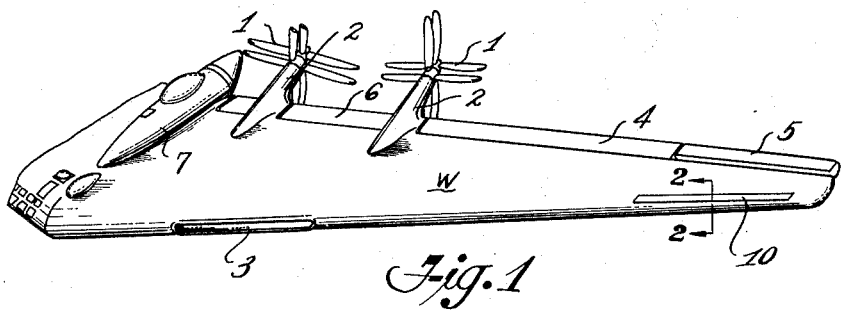
Figure 1 is a perspective view of part of an all-wing army bomber utilizing the automatic slot control of the present invention.

Referring to the drawings:

In Figure 1, one wing panel W of an all-wing army bomber known as the B-35 of 172 ft. wing spread is shown, the wing panels being sharply swept back. Such an airplane may be driven by contra-rotating propellers 1 from engines housed within the wing panels through propeller shaft housings 2, cooling of these engines being accomplished through a leading edge air intake 3. Normal control of the airplane is by elevons 4 actuated either simultaneously or independently, and split rudders 5 for producing unilateral drag at the wing tips. Large area landing flaps 6 are positioned between the propeller housings 2 and the crew nacelle 7.

Figure 2:
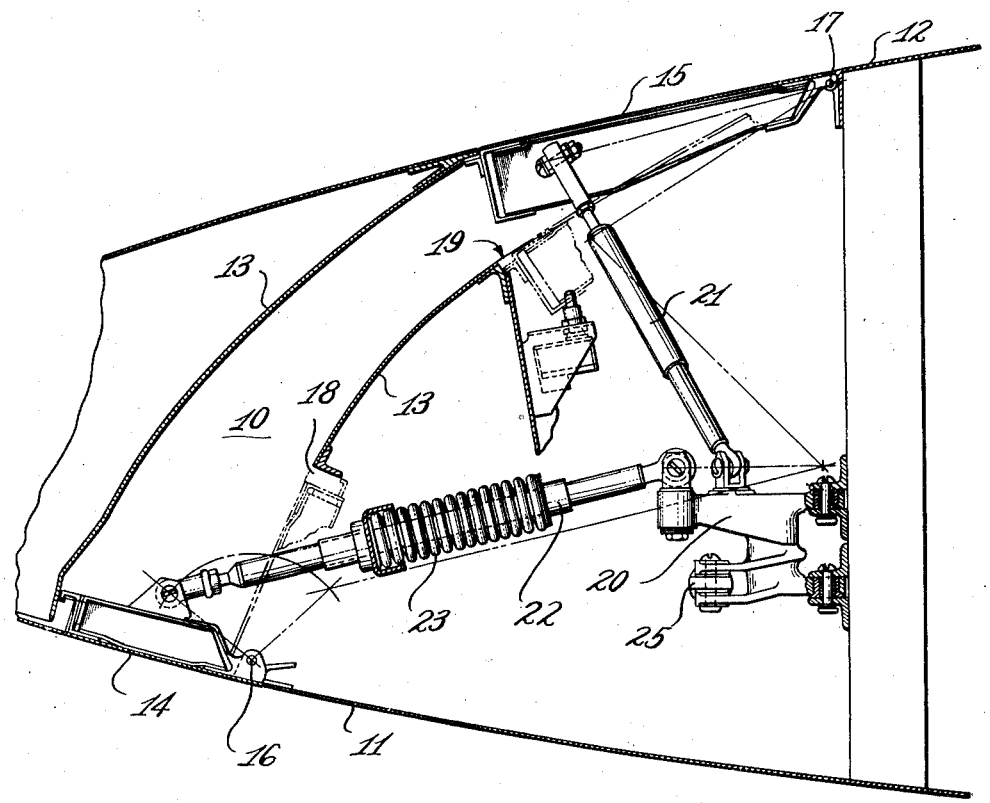
Figure 2 is a fragmentary cross sectional view taken as indicated by the line 2—2 in Figure 1.
Figure 3:
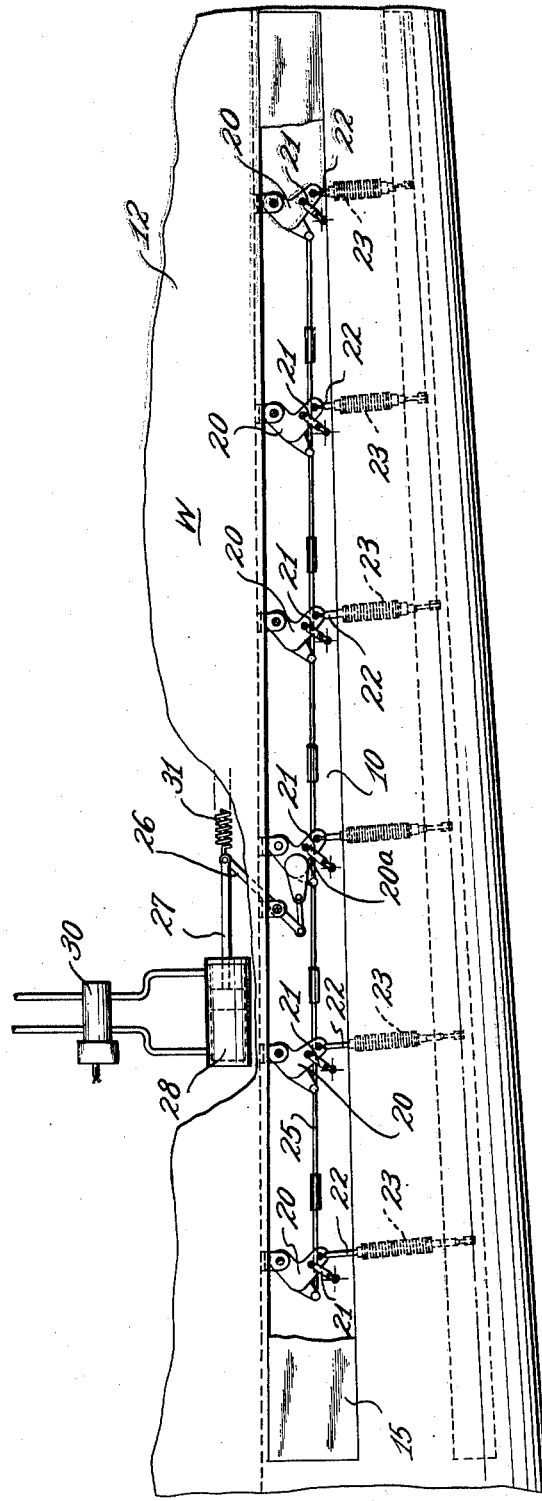
Figure 3 is a diagrammatic view from above showing closure linkages.

To prevent wing tip stall, a wing tip slot 10 is positioned near the leading edge of each wing panel adjacent the wing panel tip, this slot being shown in more detail in Figures 2 and 3.

Referring to these latter figures, the slot starts from under wing surface 11 and curves rearwardly to open on the upper wing surface 12, the slot being defined within the wing panel by slot walls 13. Slot 10 is closed at one end by a flush lower surface door or closure 14 and at the other end by an upper surface door or closure 15. Closures 14 and 15 are rearwardly pivoted on axles 16 and 17 respectively, and swing inwardly into apertures 18 and 19 respectively, in the rear slot wall 13, again assuming flush positions to provide smooth interior walls for the slot when open.

Doors 14 and 15 are actuated by a plurality of bell cranks 20, each connected to upper door 15 by upper actuating rod 21, and to the lower door 14 by lower actuating rod 22, the latter being spring loaded as by spring 23.

All of the bell cranks 20 are operated by a connecting rod 25 as shown in Figure 3, one bell crank 20a being rotated by lever link 26 driven by the piston rod 27 of a hydraulic motor 28 under control of an electrically operated hydraulic solenoid valve 30. A strong emergency slot opening spring 31 is attached to piston rod 27. Hydraulic valve 30 is constructed to hold the doors 14 and 15 closed against spring 31 by continuous application of hydraulic pressure in motor 28. Thus, loss of hydraulic pressure to the motor 28 would enable spring 31 to open doors 14 and 15.

Figure 4:
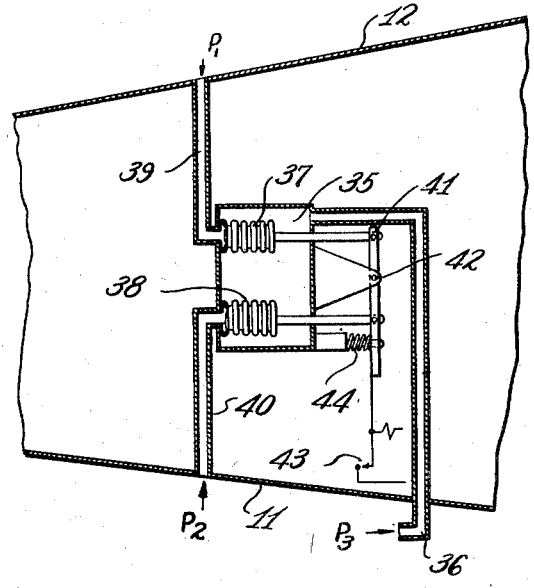
Figure 4 is a diagrammatic sectional view of a pressure switch.

Each of the wing panels is provided with a slot, and slot opening and closing means as described, and, in addition, is provided with two pressure switches adjacent each of the slots as shown in Figure 4, each of the pressure switches comprises a compartment 35 connected to an air scoop 36 extending below the boundary layer on the lower wing surface 11. This provides total head pressure referred to hereafter as $P_3$. Inside compartment 35 is an upper surface pressure bellows 37 and a lower surface pressure bellows 38 respectively connected to upper wing surface 12 by pipe 39 and lower wing surface 11 by a second pipe 40. The developed pressures are herein designated as $P_1$ and $P_2$ respectively, and are preferably picked up by pipes 39 and 40 at the 16% chord line. The pressure ratio of the pressures acting on bellows 37 and 38, $$\frac{P_3-P_1}{P_3-P_2}$$

is a unique function of the wing lift coefficient, so that with proper adjustment of the bellows area or the fulcrum point 42 the pressure switch can be used to indicate a predetermined lift coefficient by connecting bellows 37 to one end of a lever 41 outside of compartment 35 with bellows 38 connected to lever 41 on the opposite side of lever axle 42. A microswitch 43 is then positioned to be actuated by one end of lever 41. At the predetermined pressure ratio the direction of the force acting on lever 41 will reverse, tending to compress the lever spring 44 (positioned to normally maintain the switch open) and thereby to close the switch 43.

Of the two pressure switches on each wing panel, one, to be referred to as trip switch 43T, is set to close at a lift coefficient of 0.6. The other switch, hereafter to be known as reset switch 43R, is adjusted to close at a lift coefficient of 0.7.

Figure 5:
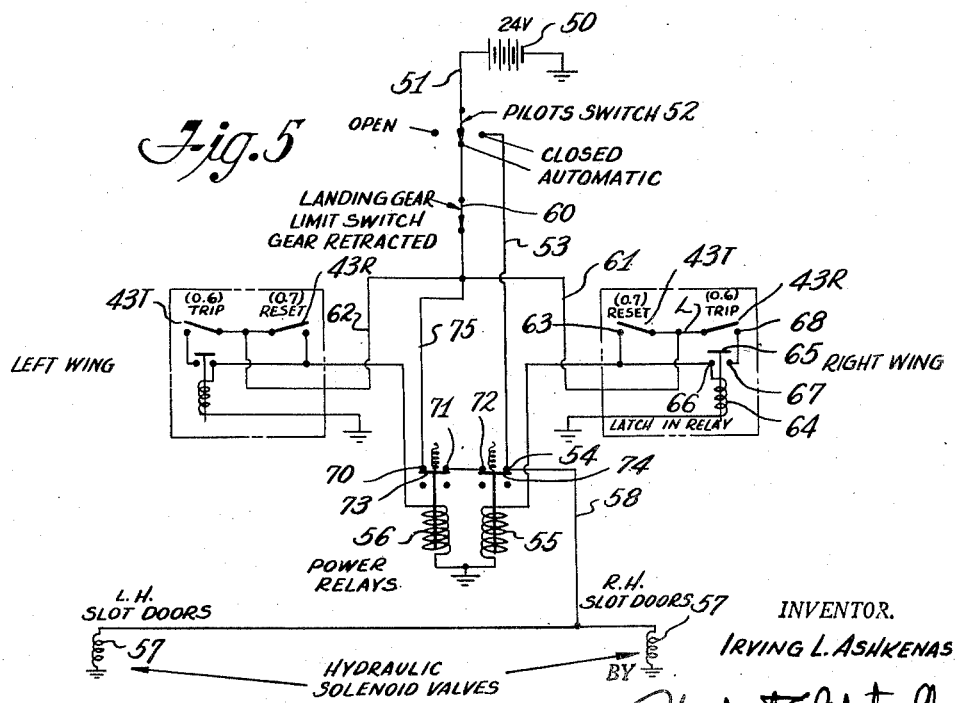
Figure 5 is a wiring diagram showing the circuit operating the slot closures in accordance with the condition of the pressure switches.

Having described the slot opening and closing mechanism and the lift coefficient switches, reference will next be made to Figure 5 showing one type of "fail safe" electrical operating circuit for slot door actuation in accordance with changes in lift coefficient, although the actual circuit shown is no part of the present invention. Other means well known in the art of obtaining the desired slot response can be utilized.

The power supply 50 for this preferred circuit is 24 v. D. C. with the negative pole grounded. The positive power lead 51 goes directly to a pilot's switch 52 having three positions; slot doors open; slot doors closed; and automatic actuation. For the slot door open conditions, switch 52 merely opens the power lead 51. For slot doors closed condition, power is transmitted by solenoid valve lead 53 directly to one terminal 54 of a pair of power relays 55 and 56 and thence directly to solenoid valve windings 57 through winding connection 58. Solenoid windings 57 operate both of the hydraulic motor valves 30 described above, both windings being in parallel.

For automatic operation, switch 52 connects directly to a landing gear switch 60 in series with power lead 51, this landing gear switch being closed when the landing gear is retracted, but open when the landing gear is extended. Thus, under the "fail safe" conditions the slots always are open when the landing gear is extended even if the pilot should forget to open them manually.

From the landing gear switch 60 the power lead extends to each pair of wing positioned pressure switches 43T and 43R through leads 61 and 62. Describing the installation on one side only, lead 61 terminates in one contact of switches 43T and 43R on the same side which are thus both tied together by link L. The other contact 63 of reset switch 43R is connected to winding 55 of one power relay and then to ground, and also to winding 64 of a latch-in relay 65, through latch-in relay contact 66, and then to ground. The other contact 67 of the latch-in relay 65 is connected to the remaining contact 68 of trip switch 43T. On the opposite wing panel, switches 43R and 43T are similarly connected, but in this case, are connected to winding 56 of the remaining power relay. Power relay contacts 70 and 71, and 72 and 54 are positioned to be bridged by connectors 73 and 74 respectively, and when either set of contacts are opened by energization of the power relay windings 55 or 56 power connection 75 to power lead 51 is opened so that solenoids 57 are deenergized. This completes the circuit description.

In automatic operation, when the pilot's switch 52 is placed in automatic position, and with the landing gear retracted, the right hand and left hand solenoid valve windings 57 will energize to cause the slot doors 14 and 15 (Figure 2) to close the slots against the spring 31 by action of hydraulic motor 28. This would be the normal flying condition. Opening of the power circuit 51 by any means, such as:

1. By actuation of pilot switch 52;
2. By actuation of landing gear switch 60;
3. By failure of power supply;
4. By closure of both reset and trip switches on either side;

will cause both slots to open by loss of energization in solenoid windings 57.

Conditions 1, 2 and 3 are obvious from the circuit of Figure 5 and the above description thereof. Condition 4, however, deserves additional description.

When either wing panel reaches a lift coefficient of 0.6 the strip switch 43T on that side closes, but since the latch-in relay winding 64 is not energized, neither of the power relay windings 55 or 56 are energized, so solenoid windings 57 remain energized and the slot doors remain closed. When the same wing panel reaches a lift coefficient of 0.7 the reset switch 43R closes, energizing the latch-in relay winding 64 which causes one of the power relay windings 55 or 56 to be energized, thus breaking a bridge 73 or 74 in the power circuit 51—75—58 to the solenoid valve windings, whereupon the doors move to open both slots. As long as the lift coefficient remains at 0.7 or above on one wing panel, the doors will remain open. When the lift coefficient is reduced below 0.7, the reset switch opens, but the doors still remain open since the latch-in relay remains energized through the trip switch 43T and the power circuit remains open. When the lift coefficient is reduced below 0.6, the trip switch 43T opens, deenergizing the latch-in relay 65 and the power relay, thus permitting the slot doors to return to the closed position.

From the above description, it will be seen that the slots are opened at a lift coefficient of 0.7, but do not close until a lift coefficient of 0.6 is reached. Also it is to be noted that both wing tip slots open when the lift coefficient of 0.7 is reached even on one wing tip, but that the doors cannot close until the lift coefficient is below 0.6 on both wings. This method of handling the wing tip slots, together with the complete "fail safe" arrangement of slot controls, make for maximum safety near the stalling point with a minimum of pilot supervision.

Figure 6:
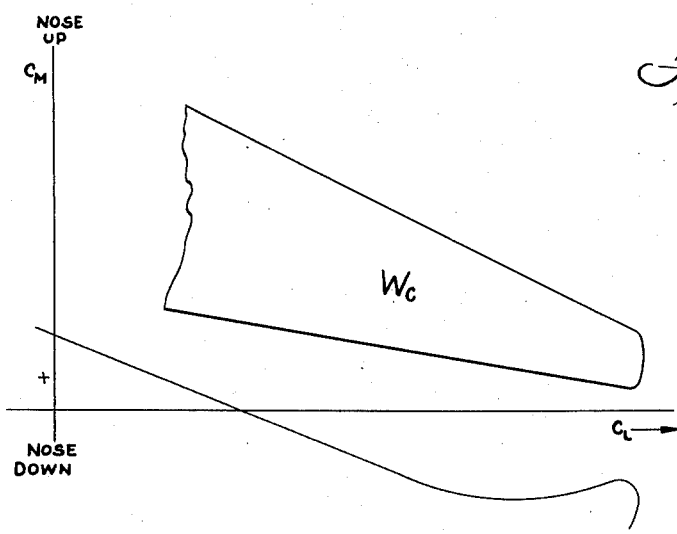
Figure 6 is a coordinate diagram of the pitching characteristics at high lift of a clean swept-back wing.
Figure 7:
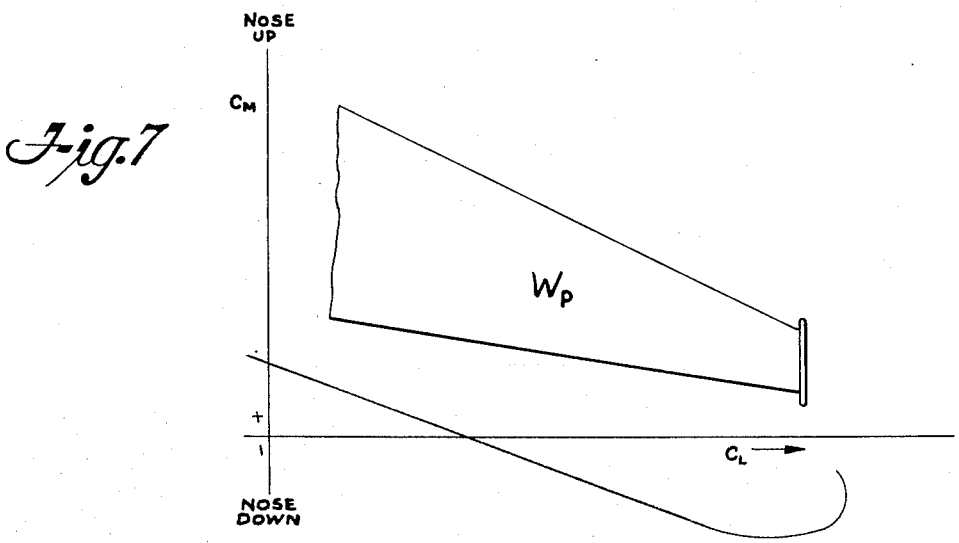
Figure 7 is a similar diagram relating to a swept-back wing with end plates.
Figure 8:
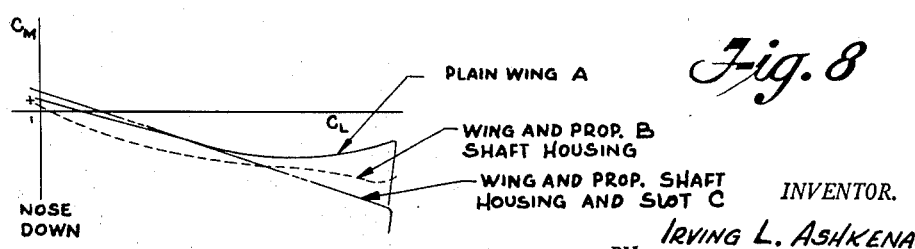
Figure 8 is a similar diagram incorporating the moment-lift curves of Figures 6 and 7 with a curve for a wing having propeller housings and a tip slot.

The effect of the various factors mentioned above on the static longitudinal stability of a tailless aircraft having swept-back wing panels is shown in the diagrams of Figures 6, 7 and 8.

In Figure 6, the pitching characteristics at high lift is shown with relation to the moment coefficient $Cm$ and lift coefficient $Cl$ for a clean swept-back wing panel $Wc$. Here it will be noticed that the tip never completely stalls, as is evidenced by the stable pitching moments shown that occur at the maximum lift coefficient. On the other hand, as illustrated in Figure 7, the use of a wing panel $Wp$ having end plates to reduce to a large extent the effects of spanwise flow, straightens the pitching moment curve, but produces the normally expected tip stall, as evidenced by the strongly unstable moments in the vicinity of the maximum lift coefficient. Thus, it is clear that any modification to the basic wing which affects the spanwise flow will have a noticeable effect on the pitching behavior at high lift coefficients.

The effect of propeller shaft housing, for example, is clearly shown in Figure 8 where the moment-lift curve A is shown for a clean swept-back wing. Curve B shows the effect of the shaft housings, and curve C gives the overall effect of a wing tip slot when used as a means for controlling tip stall. The stability introduced by the wing tip slots is clearly shown.

While the present invention has been described as applied to airplanes of the tailless type, it will be clear to those skilled in the art that the means and method of controlling stall are applicable to any airplane where slots can advantageously be used to increase the stalling angle. Furthermore, it is also clear that the device herein made illustrative of the invention is of advantage to control tip stall regardless of how the tendency for tip stall is accomplished.

What is claimed is:

1. In an airplane having laterally extending wing panels, a lift increasing slot adjacent the leading edge of the tip portion of each of said wing panels, upper and lower closures for said slots, closure actuating means, an operating member, closure controlling means on each wing tip for moving said operating member in accordance with the ratio of the difference between dynamic pressure generated by the airstream past the wing tip and the pressure of the boundary layer above the wing tip, to the difference between said dynamic pressure and the pressure of the boundary layer below the wing tip, said member being connected to actuate said closure actuating means at predetermined values of said ratio.

2. Apparatus in accordance with claim 1 wherein said closure controlling means include a bellows connected to the boundary layer above the wing panel tip, a second bellows connected to the boundary layer below the wing panel tip, and an enclosure for both bellows connected to an air scoop positioned outside of either boundary layer, and wherein said member is a lever connected by a link to each of said bellows whereby said lever is moved by one of said bellows or the other in accordance with the respective pressure differentials to which said respective bellows are subjected.

3. Apparatus in accordance with claim 1 wherein each of said operating members is connected to actuate both of said closure actuating means so that at a predetermined value of said ratio on either wing tip both of said closure actuating means will be actuated.

4. In an airplane having laterally extending wing panels, a lift increasing slot adjacent the leading edge of the tip portion of each of said wing panels, upper and lower closures for said slot, a closure actuating motor for simultaneously opening and closing said slot closures, a power source, motor actuating means between said source and said motor, means on each wing tip for measuring the ratio of the difference between dynamic pressure generated by the airstream past the wing tip and the pressure of the boundary layer above the wing tip, to the difference between said dynamic pressure and the pressure of the boundary layer below the wing tip, said latter means being connected to operate said motor actuating means to open said slot when said ratio rises above a predetermined value and to close said slot when said ratio falls below a predetermined value.

5. Apparatus in accordance with claim 4 wherein both of said motor actuating means are connected to be operated simultaneously in response to a variation in either direction from said predetermined value of the pressure ratio measured by either of said pressure ratio measuring means.

6. In an airplane having laterally extending wing panels, a lift increasing slot adjacent the leading edge of the tip portion of each of said wing panels, upper and lower closures for said slots, a hydraulic closure motor connected to said closures to open and close said slots, a source of hydraulic fluid under pressure, an electrically operated solenoid valve between said source and said motor and normally in a position to cause said motor to hold said closures closed when said motor is energized through said value, elastic means urging said closures to open position in the absence of motor energization, and closure controlling means in the tip of each wing panel including a bellows connected to the boundary layer above the wing panel, a second bellows connected to the boundary layer below the wing panel tip, an enclosure for both bellows connected to an airscoop positioned outside of either boundary layer, a lever connected by a link to each of said bellows whereby said lever is moved by one of said bellows or the other in accordance with the respective pressure differentials to which said respective bellows are subjected, and electrical contacts actuated by said lever, said contacts being connected to actuate said solenoid value to open said closures at a predetermined lever position.

7. Apparatus in accordance with claim 6 wherein the contacts actuated by both levers are connected to operate both solenoid valves at a predetermined position of either lever.

IRVING L. ASHKENAS.

REFERENCES CITED

The following references are of record in the file of this patent:

UNITED STATES PATENTS

| Number | Name | Date |
|---|---|---|
| 1,351,538 | Reynolds | Aug. 31, 1920 |
| 2,373,089 | Allen et al. | Apr. 10, 1945 |
| 2,386,288 | Blaylock | Oct. 9, 1945 |